United States Patent
Kakui

(10) Patent No.: US 11,556,661 B2
(45) Date of Patent: Jan. 17, 2023

(54) DATA ACCESS CONTROL SYSTEM AND DATA ACCESS CONTROL METHOD

(71) Applicant: Hitachi, Ltd., Tokyo (JP)

(72) Inventor: Kentaro Kakui, Tokyo (JP)

(73) Assignee: HITACHI, LTD., Tokyo (JP)

( * ) Notice: Subject to any disclaimer, the term of this patent is extended or adjusted under 35 U.S.C. 154(b) by 223 days.

(21) Appl. No.: 17/022,722

(22) Filed: Sep. 16, 2020

(65) Prior Publication Data

US 2021/0303706 A1  Sep. 30, 2021

(30) Foreign Application Priority Data

Mar. 30, 2020 (JP) ............................. JP2020-060243

(51) Int. Cl.
*G06F 21/62* (2013.01)
*G06F 21/60* (2013.01)
*G06F 21/57* (2013.01)

(52) U.S. Cl.
CPC ............ *G06F 21/604* (2013.01); *G06F 21/57* (2013.01); *G06F 21/6218* (2013.01); *G06F 2221/2141* (2013.01)

(58) Field of Classification Search
CPC .... G06F 21/604; G06F 21/57; G06F 21/6218; G06F 2221/2141; G06F 21/60; G06F 12/00
See application file for complete search history.

(56) References Cited

U.S. PATENT DOCUMENTS

| | | | |
|---|---|---|---|
| 2012/0317135 A1 | 12/2012 | Jin et al. | |
| 2013/0097665 A1* | 4/2013 | Ikeda | G06F 21/62 726/1 |
| 2015/0180872 A1 | 6/2015 | Christner et al. | |
| 2019/0187980 A1* | 6/2019 | Patton | G06F 16/256 |
| 2019/0243772 A1* | 8/2019 | Roberts | G06F 3/0619 |
| 2019/0327271 A1* | 10/2019 | Saxena | H04L 41/16 |

FOREIGN PATENT DOCUMENTS

| | | | | |
|---|---|---|---|---|
| WO | WO-2015187155 A1 * | 12/2015 | ............. | G06F 16/10 |
| WO | WO-2019012572 A1 * | 1/2019 | ............. | G06F 12/00 |

\* cited by examiner

*Primary Examiner* — Joseph P Hirl
*Assistant Examiner* — Aayush Aryal
(74) *Attorney, Agent, or Firm* — Mattingly & Malur, PC

(57) ABSTRACT

A predetermined access control policy is generated with reference to a lineage table and a metadata table to be stored in a policy table, and an access control policy which should be applied or recommended to treated data is provided with reference to the policy table.

12 Claims, 20 Drawing Sheets

| id | TYPE (type) | IDENTIFICATION NAME (name) | BELONGING (belongsTo) | ... |
|---|---|---|---|---|
| D001 | Table | source.csv | - | |
| D002 | Table | target.csv | - | |
| D003 | Column | id | D001 | |
| D004 | Column | customer_name | D001 | |
| D005 | Column | prefecture | D001 | |
| D006 | Column | full_address | D002 | |
| D007 | Column | id | D002 | |
| D008 | Column | prefecture | D002 | |
| D009 | Table | source2.csv | - | |
| D010 | Table | target2.csv | - | |
| ... | | | | |

FIG. 5A

DATA FILE "source.csv" (202A) → DATA PROCESSING UNIT "remove_pii" (203A) → DATA FILE "target.csv" (202B)

| id | IDENTIFICATION NAME (name) | PROCESSING SOURCE (input) | PROCESSING TARGET (output) | ... |
|---|---|---|---|---|
| L001 | remove_pii | D001 | D002 | |
| L002 | remove_pii | D003 | D007 | |
| L003 | remove_pii | D005 | D008 | |
| L004 | remove_pii | D009 | D010 | |
| ... | | | | |

FIG. 6

| id | TAG 1 (tag1) | TAG 2 (tag2) | TAG 3 (tag3) | ... |
|---|---|---|---|---|
| D001 | PII | - | - | - |
| D002 | PII-free | - | - | - |
| D004 | PII | - | - | - |
| D006 | PII | - | - | - |
| L001 | remove-PII | - | - | - |
| L004 | remove-PII | - | - | - |
| ... | | | | |

| id | ACTION SUBJECT (subject) | RESOURCE (resource) | ACTION (action) | EFFECT (effect) | STATUS (status) |
|---|---|---|---|---|---|
| R001 | PrivilegedUser | D001 | read | Permit | endorsed |
| R002 | AnySubject | D001 | AnyAction | Deny | endorsed |
| R003 | PrivilegedUser | D002 | read | Permit | candidate |
| R004 | AnySubject | D002 | AnyAction | Deny | candidate |
| ... | | | | | |

FIG. 9

| id | ACTION SUBJECT (subject) | RESOURCE (resource) | ACTION (action) | EFFECT (effect) | STATUS (status) |
|---|---|---|---|---|---|
| R001 | PrivilegedUser | D001 | read | Permit | endorsed |
| R002 | AnySubject | D001 | AnyAction | Deny | endorsed |
| R003 | AnySubject | D002 | read | Permit | endorsed |
| R004 | PrivilegedUser | D009 | read | Permit | endorsed |
| R005 | AnySubject | D009 | AnyAction | Deny | endorsed |
| R006 | AnySubject | D010 | read | Permit | candidate |
| ... | | | | | |

2071B

| id | TYPE (type) | IDENTIFICATION NAME (name) | BELONGING (belongsTo) | ... |
|---|---|---|---|---|
| D011 | Table | source.csv | - | |
| D012 | Table | target.csv | - | |
| D013 | Table | source2.csv | - | |
| D014 | Table | target2.csv | - | |
| ... | | | | |

| id | ACTION SUBJECT (subject) | RESOURCE (resource) | ACTION (action) | EFFECT (effect) | STATUS (status) |
|---|---|---|---|---|---|
| R007 | PrivilegedUser | D011 | AnyAction | Permit | endorsed |
| R008 | AnySubject | D011 | read | Permit | endorsed |
| R009 | AnySubject | D012 | read | Permit | endorsed |
| R010 | PrivilegedUser | D013 | AnyAction | Permit | endorsed |
| R011 | AnySubject | D013 | read | Permit | endorsed |
| R012 | AnySubject | D014 | read | Permit | candidate |
| ... | | | | | |

| id | TYPE (type) | IDENTIFICATION NAME (name) | BELONGING (belongsTo) | ... |
|---|---|---|---|---|
| D015 | Table | source.csv | - | |
| D016 | Table | master.csv | - | |
| D017 | Table | target.csv | - | |
| ... | | | | |

| id | ACTION SUBJECT (subject) | RESOURCE (resource) | ACTION (action) | EFFECT (effect) | STATUS (status) |
|---|---|---|---|---|---|
| R013 | PrivilegedUser | D015 | read | Permit | endorsed |
| R014 | AnySubject | D016 | read | Permit | endorsed |
| R015 | PrivilegedUser | D017 | read | Permit | candidate |
| ... | | | | | |

FIG. 20

| id | ACTION SUBJECT (subject) | RESOURCE (resource) | ACTION (action) | EFFECT (effect) | STATUS (status) |
|---|---|---|---|---|---|
| R016 | ExampleRole | D015 | read | Permit | endorsed |
| R017 | ExampleRole | D016 | read | Deny | endorsed |
| R018 | PrivilegedUser | D017 | read | Permit | candidate |
| ... | | | | | |

2071E

DATA ACCESS CONTROL SYSTEM AND DATA ACCESS CONTROL METHOD

CROSS-REFERENCE TO RELATED APPLICATION

The present application claims priority from Japanese application JP 2020-060243, filed on Mar. 30, 2020, the contents of which is hereby incorporated by reference into this application.

BACKGROUND OF THE INVENTION

1. Technical Field

The present invention relates to a data access control system and a data access control method.

2. Description of the Related Art

In recent years, a data lake has been constructed for the purpose of sharing various data within a company and promoting utilization thereof. However, as the scale thereof expands, an operation of applying an access control policy which defines access permission/denial to data to individual data becomes complicated.

As technologies related to this, there are US Patent Application Publication No. US 2012/0317135 A1 and US Patent Application Publication No. US 2015/0180872 A1, for example. US Patent Application Publication No. US 2012/0317135 A1 recommends the other part who shares a file. It is checked whether sharing to the other part violates the access control policy. In US Patent Application Publication No. US 2015/0180872 A1, on the assumption that resources have a tree-structured hierarchical relationship, a child resource inherits the access permission to a parent resource.

SUMMARY OF THE INVENTION

In US Patent Application Publication No. US 2012/0317135 A1, the access control policy based on a hierarchy within an organization is already defined, and an object thereof is to share files within a range permitted by the policy. However, the other part to share is not always limited within a default policy permission range.

US Patent Application Publication No. US 2015/0180872 A1 presupposes that an obvious hierarchical relationship is present in a resource (data) group that is a target of access control. However, the data stored in the data lake is not necessarily in such a well-organized state.

As described above, US Patent Application Publication No. US 2012/0317135 A1 and US Patent Application Publication No. US 2015/0180872 A1 are the technologies of eliminating the complexity of policy definition based on the assumption that requirements for access control are defined by a hierarchical relationship of organization or data. However, US Patent Application Publication No. US 2012/0317135 A1 and US Patent Application Publication No. US 2015/0180872 A1 are insufficient to reduce man-hours required for setting the access control in the data lake intended to share various data across the organization.

An object of the present invention is to reduce the man-hours required for setting the access control in the data access control system.

A data access control system according to one aspect of the present invention is a data access control system including a data lake, in which the data lake includes a data store including a data file, a data processing unit that treats treatment source data stored in the data file and generates treatment target treated data, and a data lake management unit including a metadata management unit and a policy administration unit, the metadata management unit includes a metadata collection unit, a lineage collection unit, a metadata table, and a lineage table, the policy administration unit includes a policy setting unit, a policy table, and a policy retrieval unit, the lineage table stores data lineage information of the data file, the data processing unit transmits the data lineage information of the data file to the lineage collection unit, the lineage collection unit collects the data lineage information to store in the lineage table, metadata of the data file is transmitted to the metadata collection unit, the metadata collection unit collects the metadata to store in the metadata table, the policy setting unit generates a predetermined access control policy with reference to the lineage table and the metadata table to store in the policy table, and the policy retrieval unit provides an access control policy which should be applied or recommended to the treated data with reference to the policy table.

A data access control method according to one aspect of the present invention is a data access control method of applying an access control policy according to a treatment content of a program in the middle of data lineage, in which an access control policy of treatment source data is applied to treatment target data generated by treatment of the data.

A data access control method according to one aspect of the present invention is a data access control method of changing an access control policy according to a treatment content of a program in the middle of data lineage, in which the access control policy after change is recommended as the access control policy which should be applied to new data based on the data lineage by data processing.

According to one aspect of the present invention, it is possible to reduce the man-hours required for setting the access control in the data access control system.

BRIEF DESCRIPTION OF THE DRAWINGS

FIG. 4 is a view illustrating a configuration of a metadata table 2061A;

FIGS. 5A and 5B are views illustrating a configuration of a lineage table 2062A using a data processing unit 203A;

FIG. 6 is a view illustrating a configuration of a tag table 2063;

FIG. 7 is a view illustrating a configuration of a policy table 2071A;

FIG. 9 is a view illustrating a configuration of a policy table 2071B;

FIG. 14 is a view illustrating a configuration of a policy table 2071C;

FIG. 18 is a view illustrating a configuration of a policy table 2071D;

FIG. 20 is a view illustrating a configuration of a policy table 2071E.

DESCRIPTION OF THE PREFERRED EMBODIMENTS

Embodiments are hereinafter described with reference to the drawings. Note that, the embodiments hereinafter described are not intended to limit the invention recited in claims, and all of elements and combinations thereof described in the embodiments are not always essential to a means for solving the invention.

In the following description, information is sometimes described by an expression such as "aaa table", but the information may be expressed by any data structure. That is, the "aaa table" may be referred to as "aaa information" to indicate that the information does not depend on the data structure. In the following description, a configuration of each table is an example; one table may be divided into two or more tables, and all or a part of two or more tables may be one table.

First Embodiment

Figure 1:
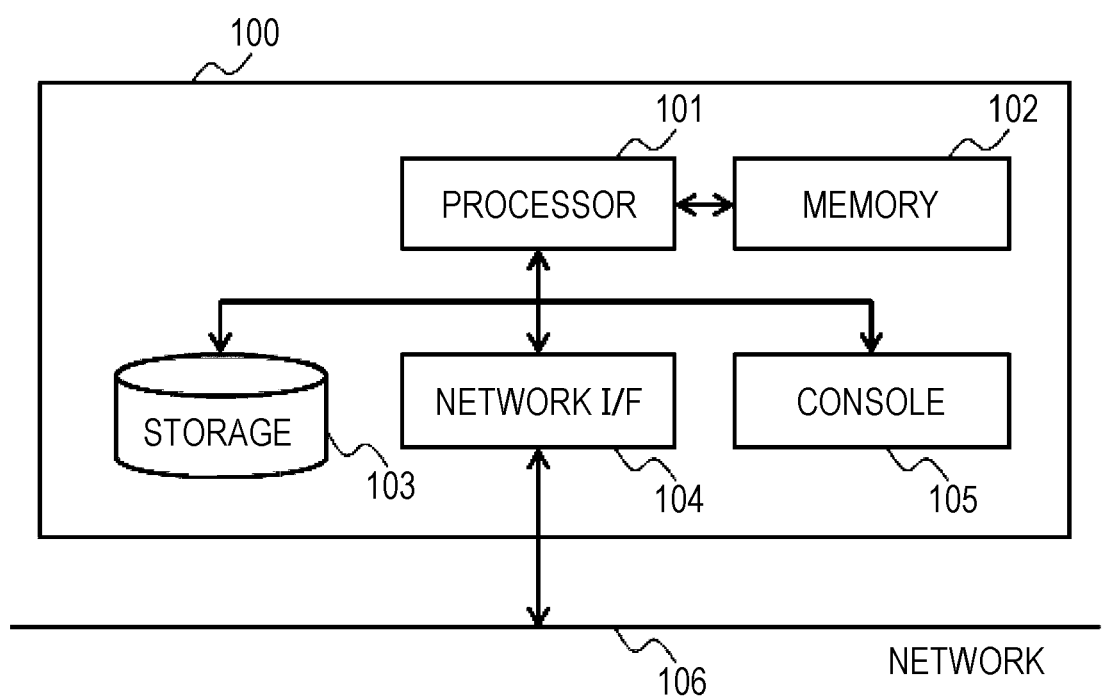
FIG. 1 is a view illustrating a configuration of an information processing device of a first embodiment.

A configuration of an information processing device according to a first embodiment is described with reference to FIG. 1.

An information processing device 100 includes a processor 101, a memory 102, a storage 103, a network I/F 104, and a console 105. The processor 101 is connected to the memory 102, the storage 103, the network I/F 104, and the console 105 via an internal bus and the like. Note that, the information processing device 100 may include a plurality of a part of or all of the processor 101, the memory 102, the storage 103, the network I/F 104, and the console 105 for the purpose of distributing a processing load, improving availability and the like. The information processing device 100 is connected to a network 106 via the network I/F 104.

The processor 101 is, for example, an arithmetic unit formed of hardware such as a central processing unit (CPU), and executes programs stored in the memory 102. The memory 102 is formed of, for example, a volatile semiconductor memory, and temporarily stores the programs and data.

The storage 103 is, for example, a non-volatile storage device such as a hard disk drive (HDD), a solid state drive (SSD), or a combination of a plurality of them, and stores programs and data for a long time. The storage 103 stores, for example, an operating system (OS) or user programs. The operating system and the user programs stored in the storage 103 are read out to the memory 102 when the information processing device 100 is started or when a process is executed. Note that, the operating system and the user programs read out to the memory 102 are executed by the processor 101 and various mechanisms are realized.

The network I/F 104 is formed of, for example, a communication device such as a network interface controller (NIC) and is connected to the network 106. The network I/F 104 performs protocol control when communicating with other devices via the network 106.

The console 105 is provided with an input device such as a keyboard and a mouse, and a display device such as a liquid crystal display panel, for example. The console 105 receives an action signal corresponding to various action inputs by the input device and notifies the processor 101 of contents of the action inputs. The console 105 displays a text, an image and the like based on text information and graphical information output from the processor 101 on the display device.

A configuration of a data access control system according to the first embodiment is described with reference to FIG. 2.

The data access control system includes a data lake 200, a user program 300, and an ID provider 400. The ID provider 400 provides a user ID. The data lake 200 includes a data store 201, a data processing unit 203, a data lake management unit 204, and an access control unit 205. The data store 201 includes a data file 202. The data lake management unit 204 includes a metadata management unit 206 and a policy administration unit 207. The access control unit 205 includes a policy decision unit 208 and a policy enforcement unit 209.

An object of the data access control system is to control access to the data file 202 by the user program 300.

Access control is implemented according to an access control policy. The access control policy is a list of permissions corresponding to an action subject. The policy manages a relationship between the action subject and the permissions. That is, the access control policy defines the relationship between the action subject and the permissions. Herein, the "action subject" is an identifier assigned to a role in which belonging users are assigned with the same permission set. In general, the identifier such as a belonging department, a post, a project in charge, a work content, and a work item is used. Such access control policy is applied as a means for realizing internal control of a company and as a means for complying with laws and regulations, and contracts between companies.

In the data access control system, when the policy enforcement unit 209 detects an access request to the data file 202 by the user program 300, the policy decision unit 208 determines whether the action subject of the user program 300 may access the data file 202 or not based on the access control policy. The policy decision unit 208 notifies the policy enforcement unit 209 of an effect of permission/denial determination, and the policy enforcement unit 209 permits or denies the access by the user program 300 to the data file 202.

The data access control system may be physically formed of one or a plurality of information processing devices 100. Each element of the data access control system is stored in the memory 102 as a program or data, and is also stored in the storage 103 as a program or data. Note that, in a case where the data access control system is physically formed of a plurality of information processing devices, the processor 101 of each information processing device 100 may perform data communication via the network 106.

Figure 3:
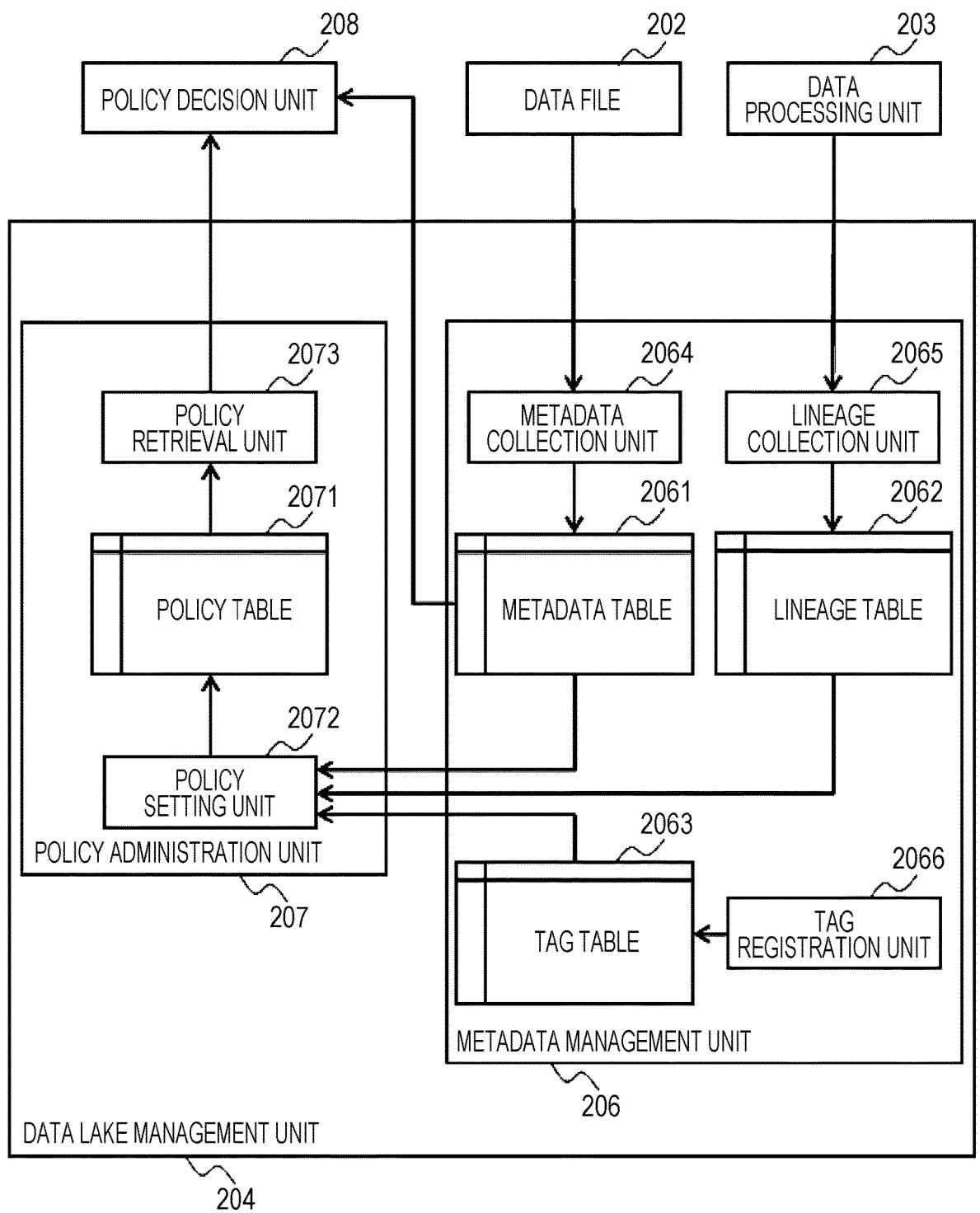
FIG. 3 is a view illustrating a configuration of a data lake management unit 204.

A detailed configuration of the data lake management unit 204 is described with reference to FIG. 3.

The data lake management unit 204 includes the metadata management unit 206 and the policy administration unit 207. The metadata management unit 206 includes a metadata collection unit 2064, a lineage collection unit 2065, a metadata table 2061, a lineage table 2062, a tag table 2063, and a tag registration unit 2066. The policy administration unit 207 includes a policy retrieval unit 2073, a policy table 2071, and a policy setting unit 2072.

An operation of the data lake management unit 204 is described with reference to FIG. 3.

An identifier (id) of processed data processed by the data processing unit 203 and an identifier of processing source data are transmitted to the lineage collection unit 2065 to be stored in the lineage table 2062. Metadata of the data file 202 is collected by the metadata collection unit 2064 to be stored in the metadata table 2061. The tag registration unit 2066 stores a tag in the tag table 2063. Herein, the metadata is not data itself, but data in which attributes representing the data and related information are described. In order to efficiently manage and retrieve the data, appropriate assignment and maintenance of the metadata are important.

The data stored in the lineage table 2062, the metadata table 2061, and the tag table 2063 are transmitted to the policy setting unit 2072. The policy setting unit 2072 sets the access control policy based on the data stored in the lineage table 2062, the metadata table 2061, and the tag table 2063, and stores the same in the policy table 2071.

The data stored in the policy table 2071 is transmitted to the policy retrieval unit 2073. The policy retrieval unit 2073 provides the access control policy to the policy decision unit 208 based on the data stored in the policy table 2071.

A configuration of a metadata table 2061A is described with reference to FIG. 4.

The metadata table 2061A includes items of id, type (type), identification name (name), and belonging (belongsTo). For example, type "Table" and identification name "source.csv" are stored in id "D001". Type "Table" and identification name "target.csv" are stored in id "D002".

For example, data specified by id "D001" in the metadata table 2061A is of the "Table" type and stores customer information. "D001" is formed of a plurality of "Column" type data, and "customer_name", "prefecture", and "full_address" represent "name", "prefecture", and "address" of a customer.

A configuration of a lineage table 2062A is described using a data processing unit 203A with reference to FIG. 5.

As illustrated in FIG. 5B, the lineage table 2062A includes items of id, identification name (name), processing source (input), and processing target (output). For example, in id "L001", "remove_pii" is stored in identification name, "D001" is stored in processing source, and "D002" is stored in processing target.

As illustrated in FIG. 5A, it is assumed that data "source.csv" of a data file 202A is processed by the data processing unit 203A and data "target.csv" of a data file 202B is generated as processed data. In this case, the data processing unit 203A is specified by an identification name "remove_pii". A processing content of the data processing unit 203A specified by "remove_pii" is processing to remove a column to which a tag "PII (personal information)" is assigned from the data.

By this processing, as illustrated in FIG. 5B, "L001" is stored in id of the lineage table 2062A, "remove_pii" is stored in identification name, "D001" is stored in processing source, and "D002" is stored in processing target. That is, in a case where the data processing unit 203A performs processing of "remove_pii", the lineage table 2062A stores "remove_pii", "D001", and "D002" as provenance information (data lineage) by the processing of the data.

In this manner, depending on the processing content of the data processing unit 203 in the middle of the data lineage, there is a case where the access control policy is changed depending on the processing content to be applied to the processed (processing target) data. For example, when the column to which the tag "PII (personal information)" is assigned is removed from the data, the access control policy of a content that all the users may read is applied. There also is a case of similarly changing the access control policy to apply even in a column masking process instead of column removal.

A configuration of the tag table 2063 is described with reference to FIG. 6.

The tag table 2063 includes items of id, tag 1 (tag1), tag 2 (tag2), and tag 3 (tag3). For example, in id "D001", "PII" is stored in tag 1. In id "D002", "PII-free" is stored in tag 1. Herein, "PII" indicates personal information, and "PII-free" indicates that there is no personal information. "Remove-PII" indicates removal of the personal information.

In this manner, the tag table 2063 may store the tag as arbitrary character string information corresponding to an arbitrary identifier (id). The number of tags corresponding to the identifier is not limited to up to three, and an arbitrary number thereof may be stored. For example, as the tag, a character string indicating that data to which a certain identifier (id) corresponds is in a specific status defined in internal control of a company, or laws and regulations and contracts between companies may be stored. A character string indicating that a lineage to which a certain identifier (id) corresponds changes the status of the processing source/processing target data may also be stored.

A configuration of a policy table 2071A is described with reference to FIG. 7.

The policy table 2071A includes items of id, action subject (subject), resource (resource), action (action), effect (effect), and status (status).

For example, in id "R001", action subject "PrivilegedUser (privileged user)", resource "D001", action "read", effect "Permit", and status "endorsed" are stored.

In id "R002", action subject "AnySubject (all users)", resource "D001", action "AnyAction", effect "Deny", and status "endorsed" are stored.

In id "R003", action subject "PrivilegedUser (privileged user)", resource "D002", action "read", effect "Permit", and status "candidate" are stored.

In id "R004", action subject "AnySubject (all users)", resource "D002", action "AnyAction", effect "Deny", and status "candidate" are stored.

The policy includes a plurality of rules. Each rule includes three conditions of the action subject (subject), the resource (resource), and the action (action), and the effect (effect) of access permission/denial determination decided when the three conditions are satisfied. A rule group is evaluated in order from top to bottom, and the evaluation ends when all the conditions are satisfied and the effect is derived. In a case where the condition is not satisfied by any of the rules, a default determination effect (for example, "Deny") is adopted.

As the identifier of the action subject, a user's ID may be used as it is, or a role name may be used as the identifier. For example, "PrivilegedUser" is the role name and means a privileged user. It may determine whether or not a certain user has the role of "PrivilegedUser" by attribute information of the user obtained from the ID provider 400.

The status (status) is information indicating whether the rule is an effective one endorsed by a manager so as to be actually provided for access control by the policy decision unit 208, or this is in a standby status for approval by the manager as a candidate thereof.

Next, an operation of policy application by simple propagation is described with reference to a flowchart in FIG. 8. A procedure of creating the policy table 2071A by the policy setting unit 2072 is illustrated.

A candidate of the access control policy (a plurality of rules) to be assigned to a newly added data file D002 is added. The lineage table 2062A is scanned and D001, which is a processing source data file of D002, is extracted, and R001 and R002, which are access control policies of D001, are duplicated (however, a column of resource (resource) is changed to D002), and R003 and R004 are added. A column of status (status) is set to "candidate" and it stands by for the approval by the manager.

Figure 8:
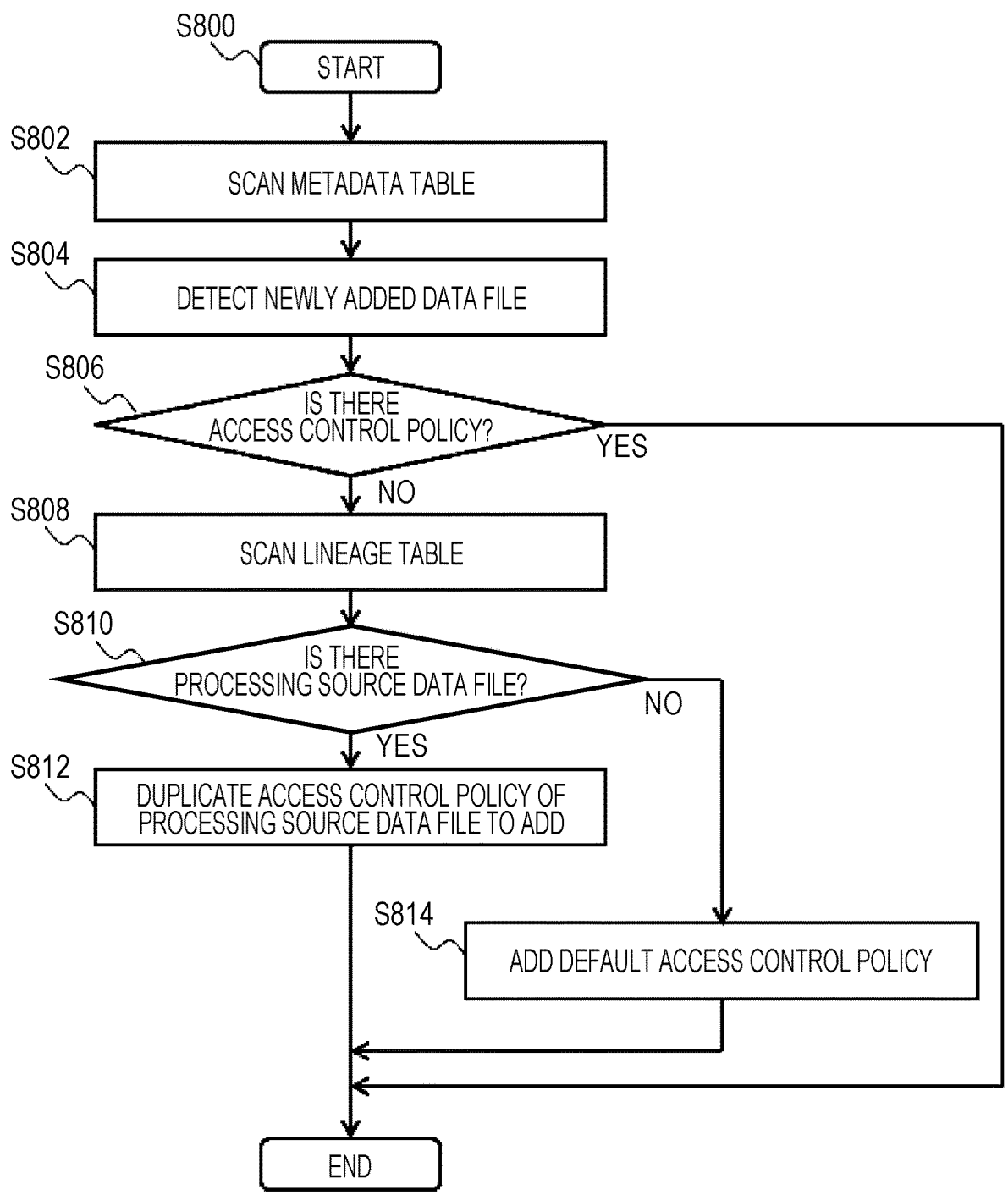
FIG. 8 is a view illustrating an operation of policy application by simple propagation.

With reference to the flowchart in FIG. 8, first, the metadata table 2061A is scanned (S802).

Next, the newly added data file (D002) is detected (S804).

Next, with reference to the policy table 2071A, it is determined whether there is the access control policy for the newly added data file (D002) (S806).

In a case where there is the access control policy for the newly added data file (D002) as a result of the determination, the procedure ends.

In a case where there is no access control policy for the newly added data file (D002) as a result of the determination, the lineage table 2062A is scanned (S808).

Next, by scanning the lineage table 2062A, it is determined whether there is a processing source data file in the lineage table 2062A (S810).

As a result of the determination, in a case where there is the processing source data file (D001) in the lineage table 2062A, the access control policies R001 and R002 of the processing source data file (D001) are detected from the policy table 2071A. Then, the access control policies R001 and R002 of the processing source data file (D001) are duplicated to be added to the policy table 2071A as the access control policies R003 and R004 for the newly added data file (D002) (S812).

As a result of the determination, in a case where there is no processing source data file in the lineage table 2062A, the default access control policy is added (S814).

In this manner, the same access control policies R003 and R004 as those of the processing source data file (D001) are applied to the newly added data file (D002). This is referred to as the application of the access control policy by the simple propagation.

Second Embodiment

Next, an operation of recommending an access control policy based on a provenance is described with reference to a flowchart in FIG. 10. A procedure of creating a policy table 2071B illustrated in FIG. 9 by a policy setting unit 2072 is illustrated.

A candidate of a policy to be assigned to a newly added data file D010 is added. A lineage table 2062A in FIG. 5B is scanned to extract D009, which is a processing source data file of D010.

Furthermore, regarding a lineage L004 which generates D010 based on D009, another lineage with the same identification name (=remove_pii) and the same processing source/processing target data file types ("Table/Table") is looked for (step S1012).

Herein, when the metadata table 2061A is scanned, the type of the processing source data file (D009) is "Table", and the type of the processing target data file (D010) is also "Table". In contrast, when the metadata table 2061A is scanned, the type of the processing source data file (D001) is "Table", and the type of the processing target data file (D002) is also "Table". Therefore, the types of the processing source and processing target (=Table/Table) of the lineage L004 are the same as the types of the processing source and processing target ("Table/Table") of a lineage L001.

The lineage L001 of the same type is found in this manner, so that R003, which is an access control policy of the processing target data file D002, is duplicated (however, a column of resource (resource) is changed to D010), and R006 is added. A column of status (status) is set to candidate and it stands by for approval by a manager.

Figure 10:
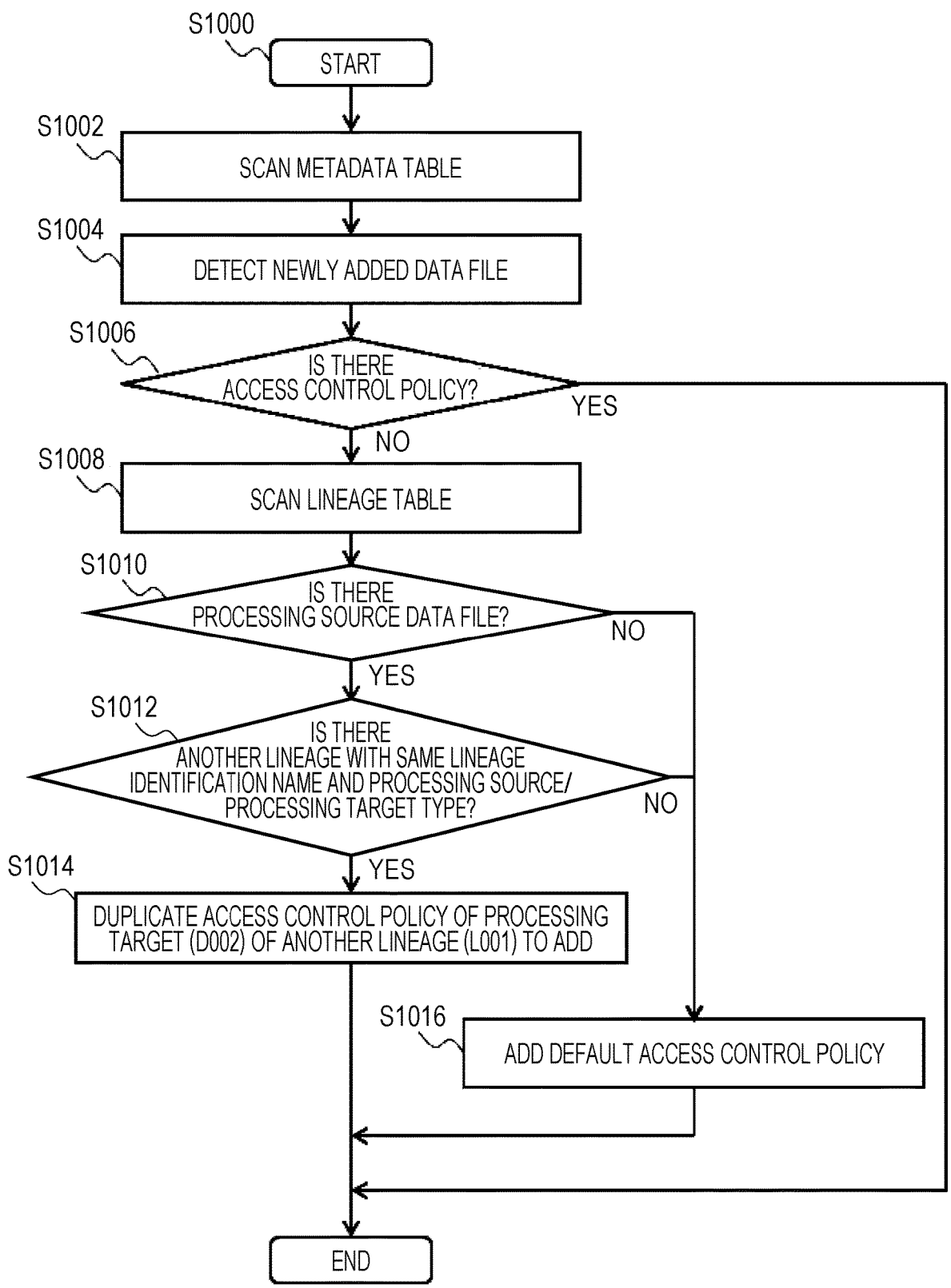
FIG. 10 is a view illustrating an operation of recommending an access control policy based on a provenance.

With reference to FIG. 10, a metadata table 2061A is first scanned (S1002).

Next, the newly added data file (D010) is detected (S1004).

Next, it is determined whether there is an access control policy for the newly added data file (D010) (S1006).

In a case where there is the access control policy for the newly added data file (D010) as a result of the determination, the procedure ends.

In a case where there is no access control policy for the newly added data file (D010) as a result of the determination, the lineage table 2062A is scanned (S1008).

Next, by scanning the lineage table 2062A, it is determined whether there is the processing source data file in the lineage table 2062A (S1010).

As a result of the determination, in a case where there is the processing source data file (D009) in the lineage table 2062A, it is determined whether there is another linage with the same lineage identification name and the same processing source/processing target types (S1012).

Next, in a case where it is determined that there is another matching lineage, the access control policy (R003) of the processing target (D002) of another lineage (L001) is duplicated (however, a column of resource (resource) is changed to D010) to be added as R006 (S1014).

As a result of the determination, in a case where it is determined that there is no other matching lineage, a default access control policy is added (S1016).

In this manner, it is recommended that the same access control policy (R006) as the access control policy (R003) of the processing target data file (D002) is applied to the newly added data file (D010). This is referred to as recommendation of the access control policy based on a provenance.

Note that, although it is determined at step S1012 whether the identification name of the lineage matches, the match may also be determined by a tag stored in a tag table 2063 instead of the identification name.

Similarly, although the match of the processing source/ processing target data file types is determined at step S1012, the match may also be determined by the tag stored in the tag table 2063 instead of the types.

Third Embodiment

A configuration of a data access control system according to a third embodiment is described with reference to FIG. 11.

The third embodiment relates to application of an access control policy associated with movement of a data storage location.

Figure 2:
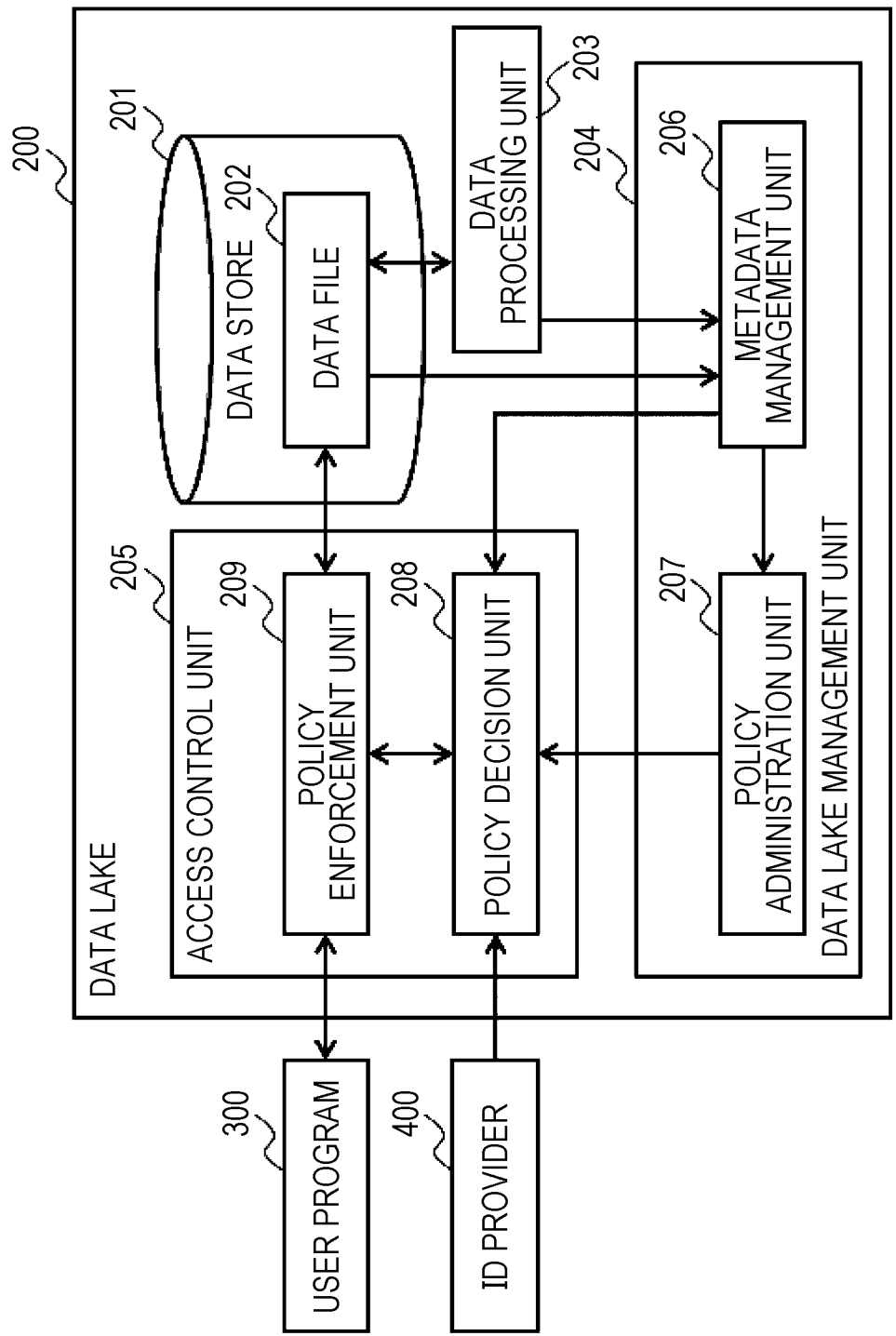
FIG. 2 is a view illustrating a configuration of a data access control system of the first embodiment.

This differs from the configuration of the data access control system of the first embodiment illustrated in FIG. 2 in including data stores 201A and 201B, and in including a data duplication unit 210 instead of the data processing unit 203. The configuration other than them is the same as the configuration of the data access control system according to the first embodiment illustrated in FIG. 2, so that detailed description thereof is omitted.

Figure 11:
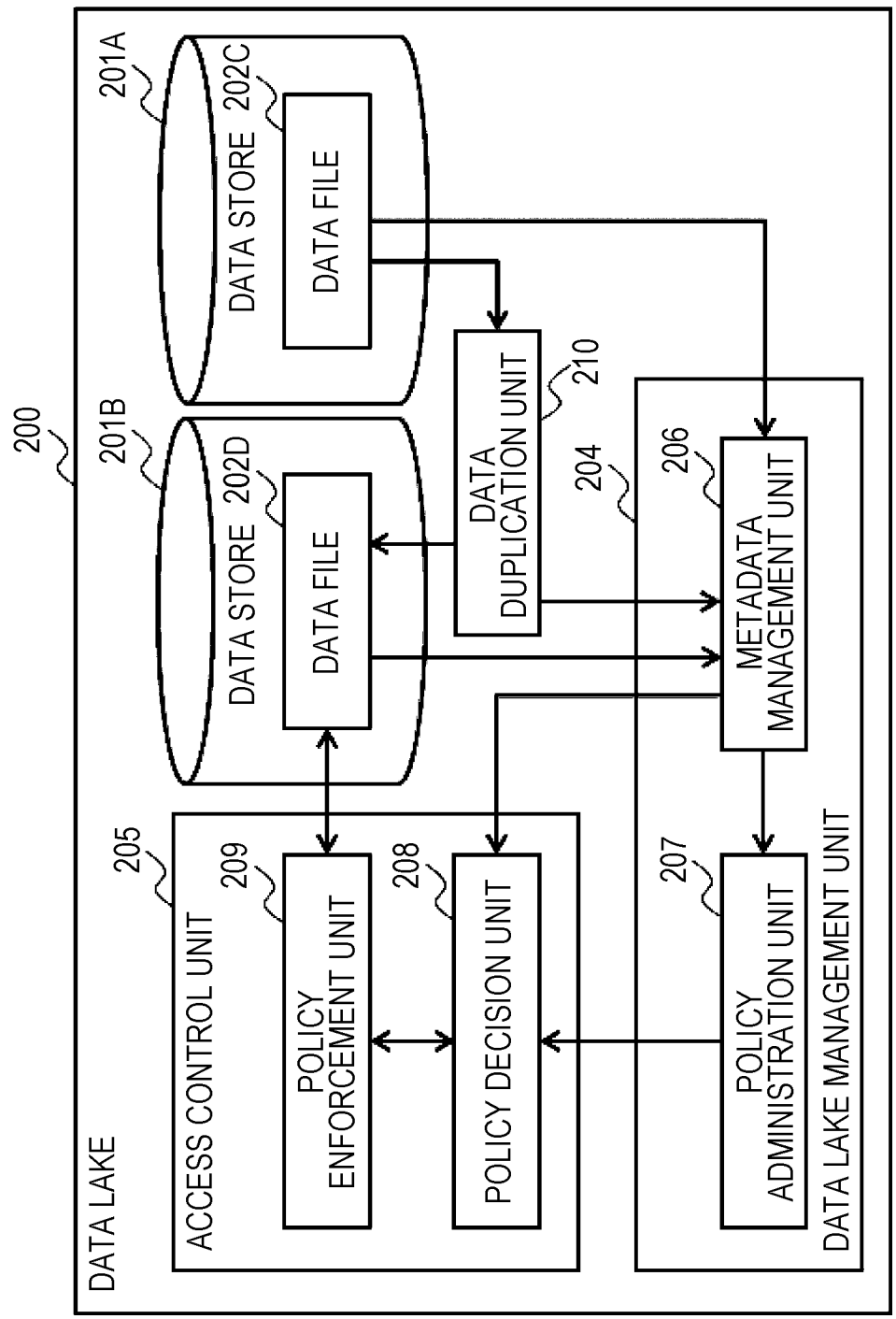
FIG. 11 is a view illustrating a configuration of a data access control system of a third embodiment.

As illustrated in FIG. 11, a data lake 200 includes the data stores 201A and 202B. The data duplication unit 210 duplicates a data file 202C to generate a data file 202D. After the duplication, the data file 202C may be retained or removed. At that time, a candidate of an access control policy which should be applied to the newly generated data file 202D is presented to a manager.

Figure 12:
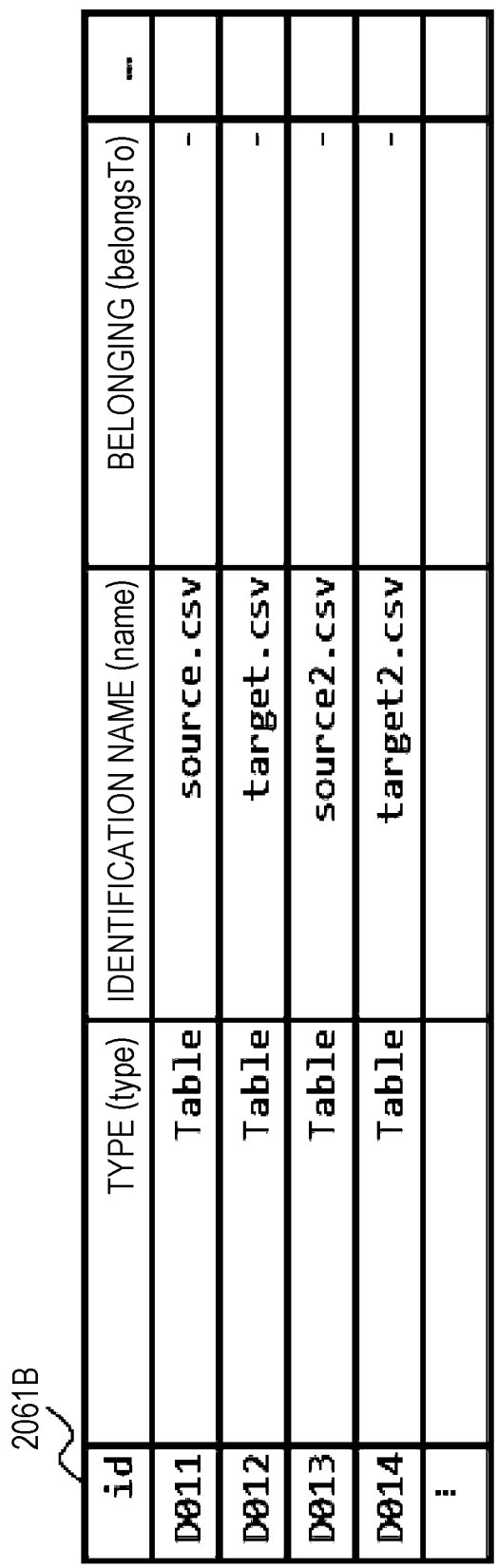
FIG. 12 is a view illustrating a configuration of a metadata table 2061B.

A configuration of a metadata table 2061B is described with reference to FIG. 12.

The metadata table 2061B includes items of id, type (type), identification name (name), and belonging (belongsTo). In id "D011", type "Table" and identification name "source.csv" are stored. In id "D012", type "Table" and identification name "target.csv" are stored. In id "D013", type "Table" and identification name "source2.csv" are stored. In id "D014", type "Table" and identification name "target2.csv" are stored.

Figure 13:
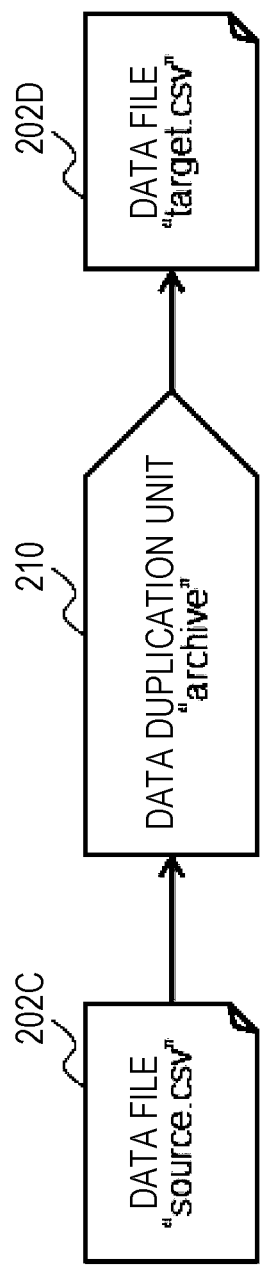
FIGS. 13A and 13B are views illustrating a configuration of a lineage table 2062B using a data duplication unit 210.

A configuration of a lineage table 2062B is described using the data duplication unit 210 with reference to FIG. 13.

As illustrated in FIG. 13B, the lineage table 2062B includes items of id, identification name (name), processing source (input), and processing target (output). For example, in id "L005", "archive" is stored in identification name, "D011" is stored in processing source, and "D012" is stored in processing target. In id "L006", "archive" is stored in identification name, "D013" is stored in processing source, and "D014" is stored in processing target.

As illustrated in FIG. 13A, it is assumed that data "source.csv" of the data file 202C is duplicated by the data duplication unit 210 having an identification name "archive" and data "target.csv" of the data file 202D is generated as duplicated data.

By this duplication, as illustrated in FIG. 13B, in the lineage table 2062B, "L005" is stored in id, "archive" is stored in identification name, "D011" is stored in processing source, and "D012" is stored in processing target. That is, in a case where the data duplication unit 210 duplicates, in the lineage table 2062B, "archive", "D011", and "D012" are stored as provenance information (data lineage) by duplication of the data.

The data duplication unit 210 duplicates the data file 202C to generate the data file 202D. The lineage collection unit 2065 records a lineage in the lineage table 2062B as a provenance of this process.

A configuration of a policy table 2071C is described with reference to FIG. 14.

The policy table 2071C includes items of id, action subject (subject), resource (resource), action (action), effect (effect), and status (status).

For example, in id "R007", action subject "PrivilegedUser (privileged user)", resource "D011", action "AnyAction", effect "Permit", and status "endorsed" are stored.

In id "R008", action subject "AnySubject (all users)", resource "D011", action "read", effect "Permit", and status "endorsed" are stored.

In id "R009", action subject "AnySubject (all users)", resource "D012", action "read", effect "Permit", and status "endorsed" are stored.

A data file "D011" is in the data store 201A. A data file "D012" is in the data store 201B. The data store 201B is a data store intended for archiving, and is not permitted to alter the data file. This access control policy is expressed by a rule of the policy table 2071C.

That is, regarding the data file "D011", when the action subject is of a role of "PrivilegedUser", any action "AnyAction" is permitted (R007). Regarding the data file "D011", only a "read" action is permitted for all the action subjects "AnySubject" (R008). Actions other than this are denied (default).

In contrast, regarding the data file D012, the "read" action by all the action subjects "AnySubject" is permitted (R009). Any action other than this is denied (default).

Figure 15:
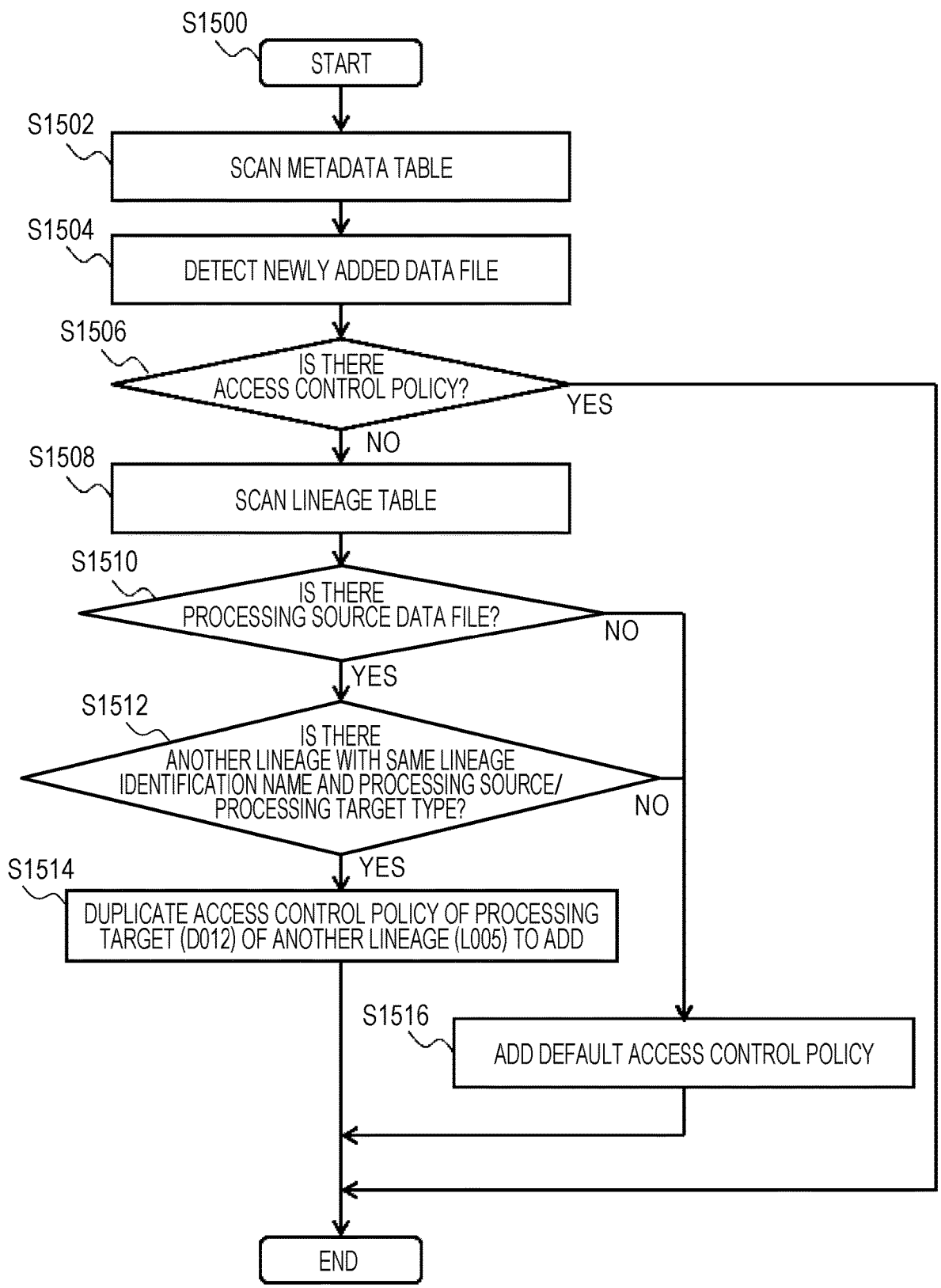
FIG. 15 is a view illustrating an operation of recommending an access control policy based on a provenance.

An operation of recommending the access control policy based on a provenance is described with reference to a flowchart in FIG. 15.

The metadata table 2061B is first scanned (S1502).

Next, a newly added data file "D014" is detected (S1504).

Next, it is determined whether there is the access control policy for the newly added data file "D014" (S1506).

In a case where there is the access control policy for the newly added data file "D014" as a result of determination, the procedure ends.

In a case where there is no access control policy for the newly added data file "D014" as a result of the determination, the lineage table 2062B is scanned (S1508).

Next, by scanning the lineage table 2062B, it is determined whether there is a processing source data file in the lineage table 2062B (S1510).

As a result of the determination, in a case where there is a processing source data file "D013" in the lineage table 2062B, it is determined whether there is another linage with the same lineage identification name and the same processing source/processing target types (S1512).

Next, in a case where it is determined that there is another matching lineage, an access control policy "R009" of a processing target "D012" of another lineage "L005" is duplicated (however, a column of resource (resource) is changed to D014) and added as R012 (S1514).

As a result of the determination, in a case where it is determined that there is no other matching lineage, the default access control policy is added (S1516).

In this manner, the same access control policy "R012" as the access control policy "R009" of the processing target data file "D012" is applied to the newly added data file "D014".

Specifically, the application of the access control policy associated with the movement of the data storage location is performed in the following manner. A procedure of creating the policy table 2071C by a policy setting unit 2072 is illustrated.

A candidate of the access control policy to be assigned to the newly added data file "D014" is added. The lineage table 2062B is scanned to extract "D013", which is a processing source data file of "D014".

Furthermore, regarding a lineage "L006" which generates D014 based on D013, another lineage with the same identification name ("archive") and processing source/processing target data file types ("Table/Table") is looked for with reference to the metadata table 2061B (step S1512).

Then, the lineage "L005" is found, so that "R009", which is the access control policy of the processing target data file "D012", is duplicated and "R012" is added. However, a column of resource "resource" is changed to "D014". A column of status (status) is set to "candidate" and it stands by for approval by the manager.

Note that, although it is determined at step S1512 whether the identification name of the lineage matches, the match may also be determined by a tag stored in a tag table 2063 instead of the identification name.

Similarly, although the match of the processing source/processing target data file types is determined at step S1512, the match may also be determined by the tag stored in the tag table 2063 instead of the types.

Fourth Embodiment

A data access control system according to a fourth embodiment is described. The third embodiment relates to the application of the access control policy in a case where there is a plurality of processing source data. A configuration of the data access control system according to the fourth embodiment is the same as the configuration of the data access control system of the first embodiment illustrated in FIG. 2, so that detailed description thereof is omitted.

Figure 16:
FIG. 16 is a view illustrating a configuration of a metadata table 2061C.

A configuration of a metadata table 2061C is described with reference to FIG. 16.

The metadata table 2061C includes items of id, type (type), identification name (name), and belonging (belongsTo). Type "Table" and identification name "source.csv" are stored in id "D015". Type "Table" and identification name "master.csv" are stored in id "D016". Type "Table" and identification name "target.csv" are stored in id "D017".

Figure 17:
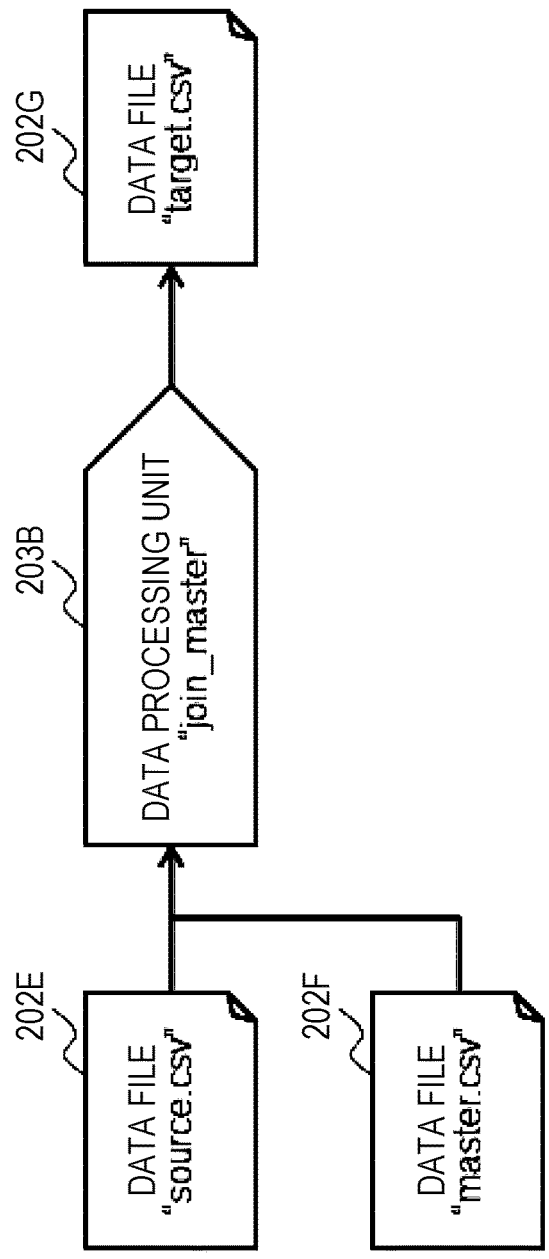
FIGS. 17A and 17B are views illustrating a configuration of a lineage table 2062C using a data processing unit 203B.

A configuration of a lineage table 2062C is described using a data processing unit 203B with reference to FIG. 17.

As illustrated in FIG. 17B, the lineage table 2062C includes items of id, identification name (name), processing source (input), and processing target (output). In id "L007", "join_master" is stored in identification name, "D015" is stored in processing source, and "D017" is stored in processing target.

In id "L008", "join_master" is stored in identification name, "D016" is stored in processing source, and "D017" is stored in processing target.

As illustrated in FIG. 17A, it is assumed that data "source.csv" of a data file 202E and data "master.csv" of a data file 202F are processed by the data processing unit 203B and data "target.csv" of a data file 202G is generated as processed data.

By this processing, as illustrated in FIG. 11B, in the lineage table 2062C, "L007" is stored in id, "join_master" is stored in identification name, "D015" is stored in processing source, and "D017" is stored in processing target. That is, in a case where the data processing unit 203B performs processing of "join_master", "join_master", "D015", and "D017" are stored as provenance information (data lineage) by processing of the data in the lineage table 2062C.

Similarly, by this processing, as illustrated in FIG. 11B, in the lineage table 2062C, "L008" is stored in id, "join_master" is stored in identification name, "D016" is stored in processing source, and "D017" is stored in processing target. That is, in a case where the data processing unit 203B performs processing of "join_master", "join_master", "D016", and "D017" are stored as provenance information (data lineage) by processing of the data in the lineage table 2062C.

In this manner, the data processing unit 203B couples the data file 202E with the data file 202F (master data) to generate the data file 202G. A lineage collection unit 2065 records a lineage in the lineage table 2062C as a provenance of this process.

A configuration of a policy table 2071D is described with reference to FIG. 18.

The policy table 2071D includes items of id, action subject (subject), resource (resource), action (action), effect (effect), and status (status).

For example, in id "R013", action subject "PrivilegedUser (privileged user)", resource "D015", action "read", effect "Permit", and status "endorsed" are stored.

In id "R014", action subject "AnySubject (all users)", resource "D016", action "read", effect "Permit", and status "endorsed" are stored.

In id "R015", action subject "PrivilegedUser (privileged user)", resource "D017", action "read", effect "Permit", and status "candidate" are stored.

As illustrated in FIG. 18, regarding a data file "D015", when the action subject is of a role of "PrivilegedUser", a "read" action is permitted (R013). Any action by all the action subjects other than this is denied (default). In contrast, regarding a data file "D016", the "read" action by all the action subjects is permitted (R014).

Regarding a data file "D017" generated by coupling the data file "D015" with the data file "D016", a rigid rule (permitted range is narrow) is applied from both "R013" and "R014". That is, when the action subject is "PrivilegedUser", the "read" action is permitted (R015). Any action by all the action subjects other than this is denied (default).

Figure 19:
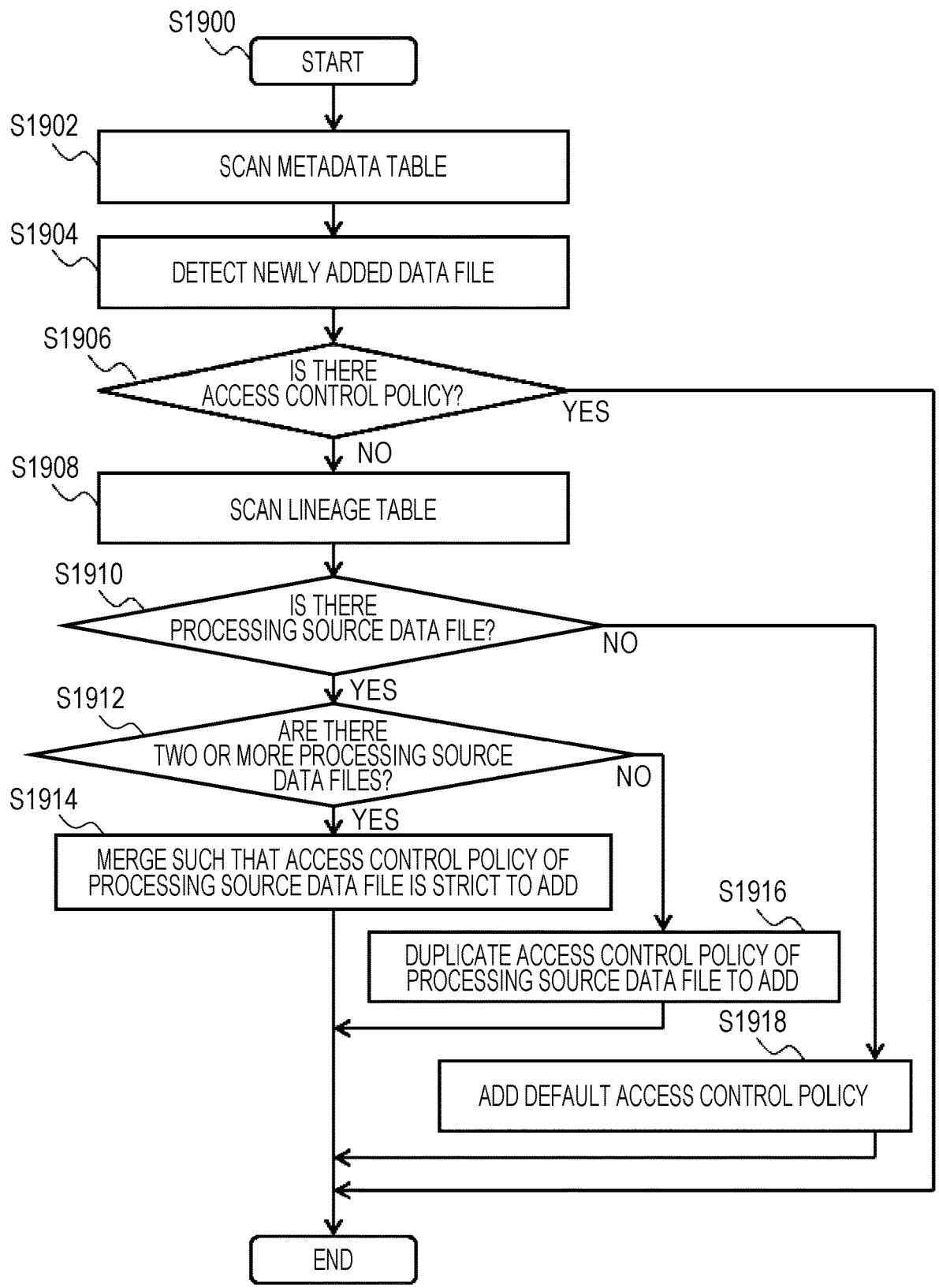
FIG. 19 is a view illustrating an operation of an access control policy application.

Next, an operation of access control policy application is described with reference to a flowchart in FIG. 19. A procedure of creating the policy table 2071D by a policy setting unit 2072 is illustrated.

The metadata table 2061C is first scanned (S1902).

Next, a newly added data file "D017" is detected (S1904).

Next, it is determined whether there is the access control policy for the newly added data file "D017" (S1906).

In a case where there is the access control policy for the newly added data file "D017" as a result of determination, the procedure ends.

In a case where there is no access control policy for the newly added data file "D017" as a result of the determination, the lineage table 2062C is scanned (S1908).

Next, by scanning the lineage table 2062C, it is determined whether there is a processing source data file in the lineage table 2062C (S1910).

As a result of the determination, in a case where there is the processing source data file in the lineage table 2062A, it is determined whether there are two or more processing source data files (S1912).

In a case where there are two or more processing source data files (D015 and D016), they are merged such that the access control policy of the processing source data file becomes strict to be added (S1914).

In a case where there are not two or more processing source data files, the access control policy of the processing source data file is duplicated to be added (S1916).

As a result of the determination at step S1910, in a case where there is no processing source data file in the lineage table 2062C, a default access control policy is added (S1918).

In this manner, a procedure of creating the policy table 2071D by the policy setting unit 2072 is as follows.

A candidate of a policy to be assigned to the newly added data file "D017" is added. The lineage table 2062C is scanned to extract "D015" and "D016", which are the processing source data files of "D017", "R013" and "R014", which are access control policies of "D015" and "D016", respectively, are merged such that the access control policy is strict (in a direction in which the permitted range is narrow), a column of resource (resource) is changed to "D017", and "R015" is added (step S1914). A column of status (status) is set to "candidate" and it stands by for approval by the manager.

Next, an example of rules that are inconsistent when merged are described with reference to FIG. 20.

A configuration of a policy table 2071E is described with reference to FIG. 20.

The policy table 2071E includes items of id, action subject (subject), resource (resource), action (action), effect (effect), and status (status).

For example, in id "R016", action subject "ExampleRole", resource "D015", action "read", effect "Permit", and status "endorsed" are stored.

In id "R017", action subject "ExampleRole", resource "D016", action "read", effect "Deny", and status "endorsed" are stored.

In id "R018", action subject "PrivilegedUser (privileged user)", resource "D017", action "read", effect "Permit", and status "candidate" are stored.

Regarding the data file "D015", when the action subject is of a role of "ExampleRole", the "read" action is permitted (R016). In contrast, regarding the data file "D016", the "read" action by the role of the action subject "ExampleRole" is denied (R017). "R013" and "R014" have the same action subject and action as satisfaction conditions, but effects (effect) thereof are opposite.

Therefore, it is not possible to generate the rigid rule (permitted range is narrow) that makes both compatible. The policy setting unit 2072 notifies the manager that the candidate of the access control policy of the data file "D017" generated by coupling the data files "D015" and "D016" cannot be generated due to this inconsistency.

In the above-described embodiments, the access control policy is applied to the new data based on the provenance information (data lineage) by data duplication/processing. Alternatively, the access control policy which should be applied is recommended. This allows management of the data lake for the purpose of sharing the data across the organization. The processing content of the data is recorded as the provenance. Regarding the new data processing, the content thereof is retrieved from the provenance by keyword match, and the access control policy which should be applied to the new data is recommended.

In the above-described embodiments, the access control policy of treatment source data is applied to the data generated by data processing. The data processing is, for example, processing, and it is applied after changing the access control policy of the source data. The access control policy is recommended based on the processing content of the data. The recommendation is made from the provenance information in which the processing content of the data is recorded. Herein, the processing content of the data is column removal or masking process. The data processing is movement of the storage location, which is applied after the access control policy of the source data is changed.

Based on the content of the movement of the data storage location, a change content of the access control policy is recommended. The recommendation is made from the provenance information in which the content of the movement of the data storage location is recorded.

A plurality of access control policies derived from a plurality of treatment source data are merged to be applied. At that time, the manager is notified that the plurality of access control policies are inconsistent.

According to the above-described embodiments, it is possible to reduce man-hours required for setting the access control. That is, it is possible to reduce the man-hours required for management by facilitating the application of the access control policy in the data lake.

Note that, the present invention is not limited to the above-described embodiments, and may be appropriately modified and carried out without departing from the spirit of the present invention.

For example, a part of or all of functional units configured by executing the programs by the processor in the above-described embodiments may be implemented by a hardware circuit. The programs in the above-described embodiments may be installed from a program source. The program source may be a program distribution server or a storage medium (for example, a portable storage medium).

What is claimed is:

1. A data access control system comprising
a data lake,
wherein the data lake includes;
a data store including a first data file and a second data file;
a data processing unit that treats treatment source data stored in the first data file and stores treated data in the second data file; and
a data lake management unit including a metadata management unit and a policy administration unit,
the metadata management unit includes a metadata collection unit, a lineage collection unit, a metadata table, and a lineage table,
the policy administration unit includes a policy setting unit, a policy table, and a policy retrieval unit,
the data processing unit transmits data lineage information of the second data file to the lineage collection unit,
the lineage collection unit collects the data lineage information to store in the lineage table,
metadata of the data file is transmitted to the metadata collection unit,
the metadata collection unit collects the metadata to store in the metadata table,
the policy setting unit generates a predetermined access control policy with reference to the lineage table and the metadata table to store in the policy table,
the policy retrieval unit provides an access control policy which should be applied or recommended to the second data file with reference to the policy table, and
the policy administration unit applies an access control policy of the first data file in which the treatment source data is stored to the second data file in which the data processing unit stores the treated data.

2. The data access control system according to claim 1, wherein
the data lake further includes an access control unit,
the access control unit includes a policy decision unit and a policy enforcement unit,
the policy decision unit decides the access control policy provided by the policy retrieval unit, and
the policy enforcement unit implements the decided access control policy.

3. The data access control system according to claim 1, wherein
the metadata management unit further includes a tag registration unit and a tag table,
the tag registration unit stores a tag in the tag table, and
the policy setting unit stores the predetermined access control policy in the policy table with reference to the tag table.

4. The data access control system according to claim 1, wherein
the data processing unit is formed of a data processing unit that processes the data file as the treatment, and the lineage collection unit collects the data lineage information transmitted by the data processing unit to store in the lineage table.

5. The data access control system according to claim 4, wherein the data processing unit merges the plurality of data files.

6. The data access control system according to claim 1, wherein
the data store is formed of a first data store including a first data file and a second data store including a second data file,
the data processing unit is formed of a data duplication unit that duplicates the first data file to obtain the second data file, and
the lineage collection unit collects the data lineage information of the second data file duplicated by the data duplication unit to store in the lineage table.

7. A data access control system comprising
a data lake,
wherein the data lake includes:
a data store including a first data file and a second data file;
a data processing unit that treats treatment source data stored in the first data file and stores treated data in the second data file; and
a data lake management unit including a metadata management unit and a policy administration unit,
the metadata management unit includes a metadata collection unit, a lineage collection unit, a metadata table, and a lineage table,
the policy administration unit includes a policy setting unit, a policy table, and a policy retrieval unit,
the data processing unit transmits data lineage information of the second data file to the lineage collection unit,
the lineage collection unit collects the data lineage information to store in the lineage table,
metadata of the data file is transmitted to the metadata collection unit,
the metadata collection unit collects the metadata to store in the metadata table,
the policy setting unit generates a predetermined access control policy with reference to the lineage table and the metadata table to store in the policy table,
the policy retrieval unit provides an access control policy which should be applied or recommended to the second data file with reference to the policy table,
the data processing unit is formed of a data processing unit that processes the data file as the treatment,
the lineage collection unit collects the data lineage information transmitted by the data processing unit to store in the lineage table, and
the data processing unit removes a column forming a table as the processing of the treatment source data stored in the data file.

8. The data access control system according to claim 1, wherein
the policy administration unit recommends to change the access control policy based on a treatment content of the treatment source data and apply the changed access control policy to the second data file in which the treated data is stored.

9. The data access control system according to claim 5, wherein
the policy administration unit applies a most rigid access control policy out of a plurality of access control policies derived from a plurality of first data files in which a plurality of treatment source data is stored to the second data file in which the treated data is stored.

10. The data access control system according to claim 9, wherein
in a case where the plurality of access control policies is inconsistent with each other, the policy administration unit notifies a manager of the inconsistency.

11. The data access control system according to claim 7, wherein
the policy administration unit applies an access control policy of the first data file in which the treatment source data is stored to the second data file in which the data processing unit stores the treated data.

12. A data access control method in a data access control system comprising:
a data lake,
wherein the data lake includes:
a data store including a first data file and a second data file;
a data processing unit that treats treatment source data stored in the first data file and stores treated data in the second data file; and
a data lake management unit including a metadata management unit and a policy administration unit,
the metadata management unit includes a metadata collection unit, a lineage collection unit, a metadata table, and a lineage table, and
the policy administration unit includes a policy setting unit, a policy table, and a policy retrieval unit,
the data access control method comprising the steps of:
transmitting, by the the data processing unit, data lineage information of the second data file to the lineage collection unit;
collecting, by the lineage collection unit, the data lineage information to store in the lineage table;
transmitting metadata of the data file to the metadata collection unit;
collecting, by the metadata collection unit, the metadata to store in the metadata table;
generating, by the policy setting unit, a predetermined access control policy with reference to the lineage table and the metadata table to store in the policy table;
providing, by the policy retrieval unit, an access control policy which should be applied or recommended to the second data file with reference to the policy table; and
applying, by the policy administration unit, an access control policy of the first data file in which the treatment source data is stored to the second data file in which the data processing unit stores the treated data.

* * * * *